(12) United States Patent
Taniguchi et al.

(10) Patent No.: US 6,700,632 B2
(45) Date of Patent: Mar. 2, 2004

(54) ILLUMINATOR APPARATUS

(75) Inventors: Hitoshi Taniguchi, Yokohama (JP); Yasuo Hira, Yokohama (JP); Toshihiko Ariyoshi, Toyohashi (JP); Seiji Umemoto, Toyohashi (JP)

(73) Assignees: Hitachi, Ltd., Tokyo (JP); Nitto Denko Corporation, Osaka (JP)

( * ) Notice: Subject to any disclaimer, the term of this patent is extended or adjusted under 35 U.S.C. 154(b) by 245 days.

(21) Appl. No.: 09/761,733

(22) Filed: Jan. 18, 2001

(65) Prior Publication Data

US 2002/0021384 A1 Feb. 21, 2002

(30) Foreign Application Priority Data

Jun. 29, 2000 (JP) ......................................... 2000-201435

(51) Int. Cl.⁷ ............................................... G02F 1/065
(52) U.S. Cl. ............................. 349/65; 349/61; 361/26; 359/49; 385/146; 385/901
(58) Field of Search ....................... 349/61, 63; 361/26, 361/31, 330; 359/49, 63; 385/146, 901; 362/31, 26, 330

(56) References Cited

U.S. PATENT DOCUMENTS

| 5,375,043 A | 12/1994 | Tokunaga | .................... 362/31 |
| 5,461,547 A | 10/1995 | Ciupke et al. | |
| 5,554,912 A | 9/1996 | Thayer et al. | ............... 315/150 |
| 5,583,484 A | 12/1996 | Asano | ........................ 340/461 |
| 6,340,999 B1 * | 1/2002 | Masuda et al. | ............... 349/63 |

FOREIGN PATENT DOCUMENTS

| EP | 0 879 991 | 11/1998 | |
| EP | 0 940 706 | 9/1999 | |
| EP | 0 997 683 | 5/2000 | |
| JP | 10-153779 | * 6/1998 | ......... G02F/1/1335 |

* cited by examiner

Primary Examiner—Tarifur R. Chowdhury
Assistant Examiner—P. R. Akkapeddi
(74) Attorney, Agent, or Firm—Antonelli, Terry, Stout & Kraus, LLP

(57) ABSTRACT

To provide a reflection type liquid-crystal display device having an illuminator in front of the liquid-crystal display device, the illuminator having a light guide plate superior in light utilization efficiency, dots constituted by a plurality of small recess or protrusion portions for reflecting the light incident on the light guide plate toward the liquid-crystal display device are formed in or on a surface of the light guide plate which does not face the liquid-crystal display device. Each of the dots is set to have a substantially V-shape in section, the sectional inclination angle of the V-shape is set in a range of from 35 to 43°, and the sectional vertex angle of the V-shape is in a range of $70.6 \pm 2.5°$.

5 Claims, 17 Drawing Sheets

L=DOT LONG-SIDE LENGTH
W=DOT SHORT-SIDE LENGTH
H=DOT DEPTH $\alpha$ = SECTIONAL INCLINATION ANGLE IN THE CASE OF SMALL RECESS PORTION
$\beta$ = VERTEX ANGLE
H = MICRO-DOT DEPTH $\alpha$ = SECTIONAL INCLINATION ANGLE IN THE CASE OF SMALL PROTRUSION PORTION
$\beta$ = VERTEX ANGLE
H = MICRO-DOT DEPTH 50 μm SQUARE DOT

CUTTING OUT OF SILICON SUBSTRATE

FORMATION OF OXIDE FILM

FORMATION OF RESIST

EXPOSURE

DEVELOPMENT

PASTING OF PROTECTIVE TAPE AND ETCHING OF OXIDE FILM

REMOVAL OF RESIST

FIG. 15H
Si ANISOTROPIC ETCHING
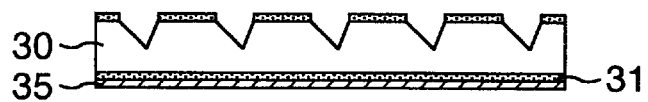
FIG. 15I
REMOVAL OF PROTECTIVE TAPE
AND REMOVAL OF OXIDE FILM
FIG. 15J
FORMATION OF PLATING
UNDERCOAT FILM
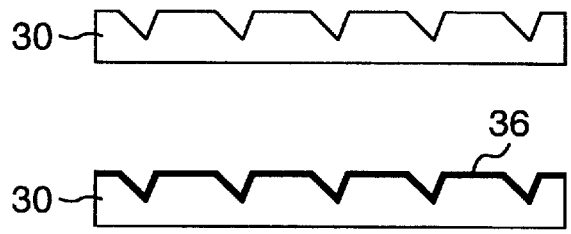
FIG. 15K
PLATING
(FORMATION OF STAMPER)
FIG. 15L
STRIPPING OF STAMPER
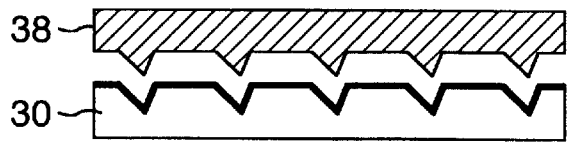
FIG. 15M
INJECTION MOLDING
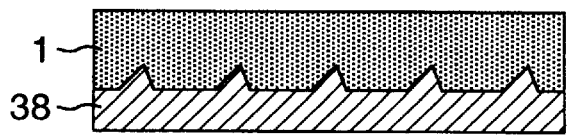

SILICON SUBSTRATE

ILLUMINATOR APPARATUS

BACKGROUND OF THE INVENTION

The present invention relates to an illuminator provided with a light guide plate, and to a liquid-crystal display device using the illuminator.

Recently, portable electronic apparatuses represented by a portable information terminal, a portable telephone, etc. have been made smaller in size and lower in price. As a result, such portable electronic apparatuses have come into wide use.

Specific examples of such a portable electronic apparatus include a reflection type liquid-crystal display device which is effective in reducing power consumption, and a liquid-crystal display device using a reflection type liquid-crystal display element and a front-lighting illuminator.

As the performance required of this illuminator, the irradiation quantity of the light which irradiates a liquid-crystal panel has to be large and the whole surface of the liquid-crystal panel has to be irradiated uniformly. The enhancement of the irradiation quantity of light is achieved easily by the increase of the quantity of the light radiated from a light source. However, such a method cannot be regarded as practical because it is accompanied by the increase of power consumption.

As the background art concerning such an illuminator, JP-A-10-188636 discloses a method in which a light source is disposed in an end portion of a light guide plate made of a transmissive material and small protrusion portions for taking the light out toward a liquid-crystal display device are formed on the lower surface of the light guide plate, as shown in FIG. 1.

In addition, JP-A-11-53918 discloses another method in which small protrusion portions (or small recess portions) for reflecting the light entering a light guide plate toward a liquid-crystal display device are formed on the upper surface of the light guide plate, as shown in FIG. 1.

Further, JP-A-11-72787 discloses a further method in which small protrusion portions or small recess portions for transmitting the light entering a light guide plate toward a liquid-crystal display device are formed at random on the lower surface of the light guide plate.

SUMMARY OF THE INVENTION

The following properties are required of an illuminator for use in the condition that it is disposed in front of a liquid-crystal display device.
(1) Haze (turbidity or cloudiness) of a light guide plate is low.
(2) The surface reflectivity is low.
(3) The light entering eyes directly from the light guide plate used in the illuminator is less.
(4) The exiting angle of the light made to go out from the lower surface of the light guide plate used in the illuminator is small.
(5) No moire pattern is produced.

In the above-mentioned background art disclosed in JP-A-10-188636, however, the exiting angle of the light made to go out from the lower surface of the light guide plate becomes large due to the sectional shape of each of the protrusion portions. Therefore, there is such a problem that not only is the light entering the liquid-crystal display device less, but also the protrusion portions are arranged regularly so that moire is produced easily.

On the other hand, in the background art disclosed in JP-A-11-53918, the aforementioned problem can be improved somewhat, but the light entering eyes directly from the light guide plate is apt to be generated due to the shape of each of the protrusion portions (or recess portions). As a result, a problem in visibility as a liquid-crystal display device still remains. In addition, moire is produced easily due to the arrangement of the protrusion portions.

Further, in the background art disclosed in JP-A-11-72787, the exiting angle of the light made to go out from the lower surface of the light guide plate becomes large due to the sectional shape of each of the protrusion portions. Accordingly, not only is the light entering the liquid-crystal display device less, but also it is difficult to dispose a large number of small protrusion portions or small recess portions irregularly.

The present invention has been developed to solve the foregoing problems. It is an object of the present invention to provide an illuminator which can enhance the irradiation quantity of the light which irradiates a liquid-crystal display device without increasing the quantity of the light radiated from a light source; a method for manufacturing the illuminator; and a liquid-crystal display device using the illuminator.

In order to attain the foregoing object, an illuminator disposed in front of a liquid-crystal cell according to the present invention is constituted by a light guide plate and a light source disposed on one of side surfaces of the light guide plate. This light guide plate includes an incidence surface on which the light from the light source is incident, and a light transmission surface through which the incident light on the light guide plate is made to exit to the liquid-crystal cell. In addition, a plurality of dots each constituted by a small recess portion or a small protrusion portion for reflecting the light incident on the incidence surface toward the light transmission surface are formed on the surface opposite to the light transmission surface. Each of the dots has a substantially V-shape in section, and an inclination angle of the section is in a range of from 35 to 43°. A vertex angle of each of the dots is set to be in a range of 70.6±2.5°.

In addition, according to the present invention, each of the dots is substantially rectangular in plan shape, and each of the dots is set to have a short-side length in a range of from 0.002 to 0.05 mm and a long-side length in a range of from 0.002 to 0.2 mm.

Then, the dots each having such a shape are disposed at random on the surface opposite to the light transmission surface of the light guide plate.

Further, according to the present invention, the light guide plate constituting the illuminator includes an incidence surface on which the light from the light source is incident, and a light transmission surface through which the incident light on the light guide plate is made to exit to the liquid-crystal cell, and a plurality of dots each constituted by a small recess portion or a small protrusion portion for reflecting the light incident on the incidence surface toward the light transmission surface are formed on the surface opposite to the light transmission surface.

Then, not smaller than 95% of the whole area of the surface on which the dots are formed is sectioned into 0.25 to 1 $mm^2$ square areas, and the dots are disposed in each of the square areas so that a function G(R) which is obtained by taking a weighted average of a radial distribution function g(R) obtained for each of the dots in accordance with an arrangement relationship of the dots, and which is obtained by approximating the weighted average by a least squares method satisfies a relation of $0<S_1/S_2<0.2$ in a range of $R/R_0=3$ to 6.

Provided that R designates a distance from a central position of one dot to a central position of another dot; $R_0$, a value obtained by dividing a length of one side of the square area by a square root of the number of the dots existing in the square area; $S_1$, a value obtained by integrating a difference between G(R) and an average value of G(R) with $R/R_0$ which is in a range of from 3 to 6; and $S_2$, a value obtained by integrating the average value of G(R) with $R/R_0$ which is in a range of from 3 to 6.

In addition, each of the dots is disposed so that the function G(R) is substantially 0 in a range of R<(short-side length of dot)×2, at least two peaks exist in the function G(R), and two peaks each of which is at least twice as large as the average value of the function G(R) exist in a range of $R/R_0$=3 to 6.

Moreover, according to the present invention, an oxide film is formed on a surface of a silicon substrate having a predetermined crystal plane and a resist film is formed on the oxide film so that each dot to be formed on the light guide plate has a V-shape in section and an inclination angle of the section is in a range of from 35 to 43°. Then, a dot pattern is formed on the oxide film with the resist film serving as a mask. Then, after anisotropic etching is given to the silicon substrate with the oxide film serving as a mask, a metal film is further formed on the silicon substrate. Further, the metal film is stripped off so as to produce a stamper or a replica thereof. Dots are transferred onto a surface of a film or plastic by use of the stamper or the replica. Thus, a light guide plate having such dots is formed.

A liquid-crystal display device according to the present invention has an illuminator which has such a light guide plate, a liquid-crystal display portion and a control portion. The illuminator is disposed in front of the liquid-crystal display portion so that external light is transmitted through the illuminator and enters the liquid-crystal display portion. The quantity of light with which the illuminator irradiates the liquid-crystal display portion is controlled by the control portion in accordance with the quantity of the external light.

Further, a portable electronic apparatus using the liquid-crystal display device according to the present invention has a light receiving portion. The illuminator is controlled by use of the quantity of the external light received by the light receiving portion so that the luminance of the liquid-crystal display portion is made substantially constant.

Furthermore, the portable electronic apparatus also has a signal receiving portion. The illuminator is controlled by the control portion with a signal supplied to the signal receiving portion as a trigger, so that the liquid-crystal display portion is irradiated with light in accordance with the external light entering the light receiving portion. Thus, the luminance of the liquid-crystal display portion is made substantially constant.

BRIEF DESCRIPTION OF THE DRAWINGS

These and other features, objects and advantages of the present invention will become more apparent from the following description when taken in conjunction with the accompanying drawings wherein:

FIGS. 15H to 15M are views showing the flow of steps of the method for manufacturing a light guide plate having micro-dots, up to the step of producing the light guide plate by use of an etching injection-molding method;

DETAILED DESCRIPTION OF EMBODIMENTS

Embodiments of the present invention will be described below in detail with reference to the drawings.

Figure 1:
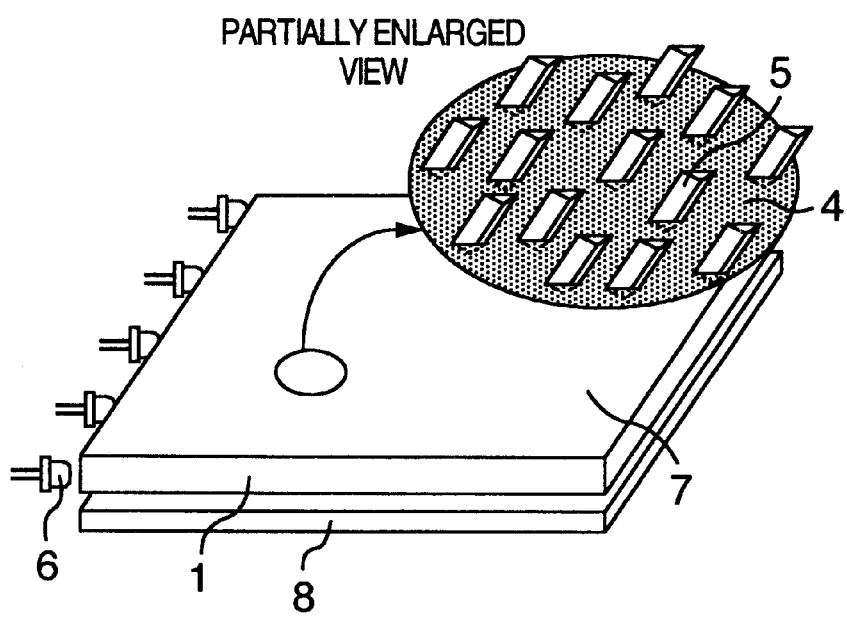
FIG. 1 is a perspective view of an illuminator for explaining a first embodiment.

FIG. 1 is a perspective view of an illuminator for use in a liquid-crystal display device according to a first embodiment. FIG. 1 also includes a perspective view of a plurality of small recess portions or small protrusion portions (hereinafter referred to as "micro-dots") surrounded by a light guide plate flat portion, for changing the travelling direction of light in the light guide plate. Incidentally, FIG. 1 illustrates the case where the dots are formed into small recess portions.

A light guide plate 1 is disposed in front of a liquid-crystal display device 8 so that the light from light sources 6 disposed on one of side surfaces of the light guide plate 1 is made incident on the light guide plate 1 and this incident light is reflected toward the liquid-crystal display device 8 by dots 5 provided on an upper surface 7 of the light guide plate 1.

Figure 2:
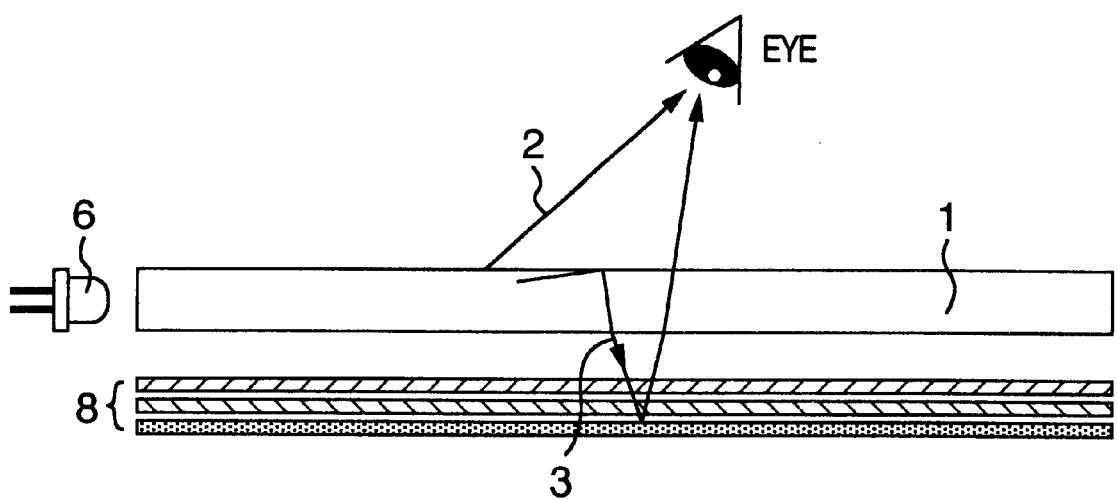
FIG. 2 is a sectional view of the illuminator for explaining the first embodiment.

FIG. 2 is a sectional view conceptually showing the relationship between the illuminator and the liquid-crystal display device. As described above, the light from the light sources 6 reflected by the dots 5 (the light 3 made to exit from the lower surface of the light guide plate) enters the liquid-crystal display device 8, and is reflected by a reflection plate provided in the liquid-crystal display device 8. Then, the reflected light is transmitted through the light guide plate 1 again and reaches eyes of an observer.

Incidentally, of the light entering the light guide plate IL from the light sources 6, the light 2 shown in FIG. 2 reaches the eyes of the observer directly without travelling through the liquid-crystal display device 8. In consideration of the object of the illuminator described in this embodiment, not to say, the light 2 reaching the eyes of the observer directly is not preferable, and it should be reduced to the utmost.

Detailed description will be made about the shape of the micro-dots 5 for attaining the foregoing object.

Figure 3:
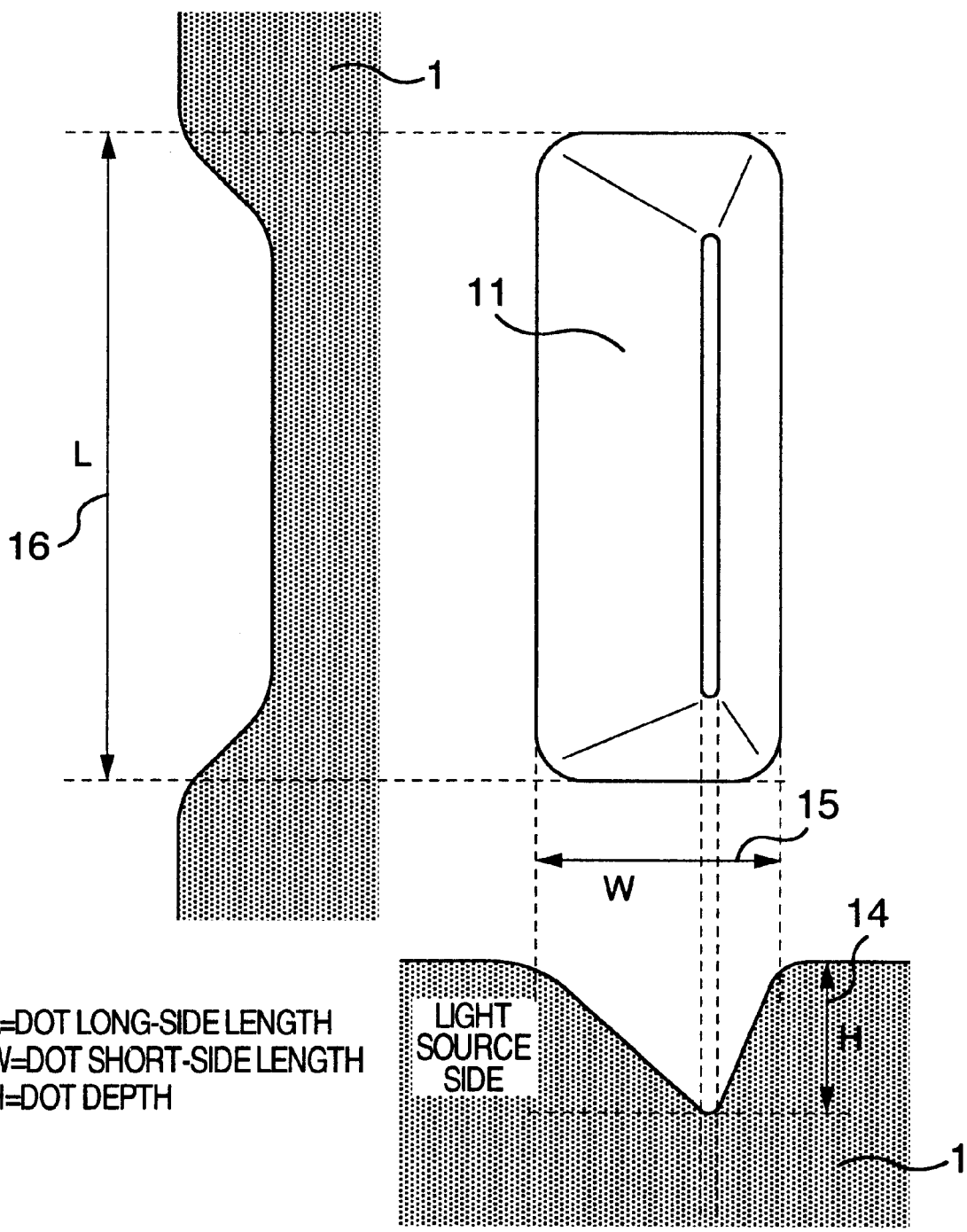
FIG. 3 is a sectional view and a plan view of a micro-dot (small recess portion)
Figure 4:
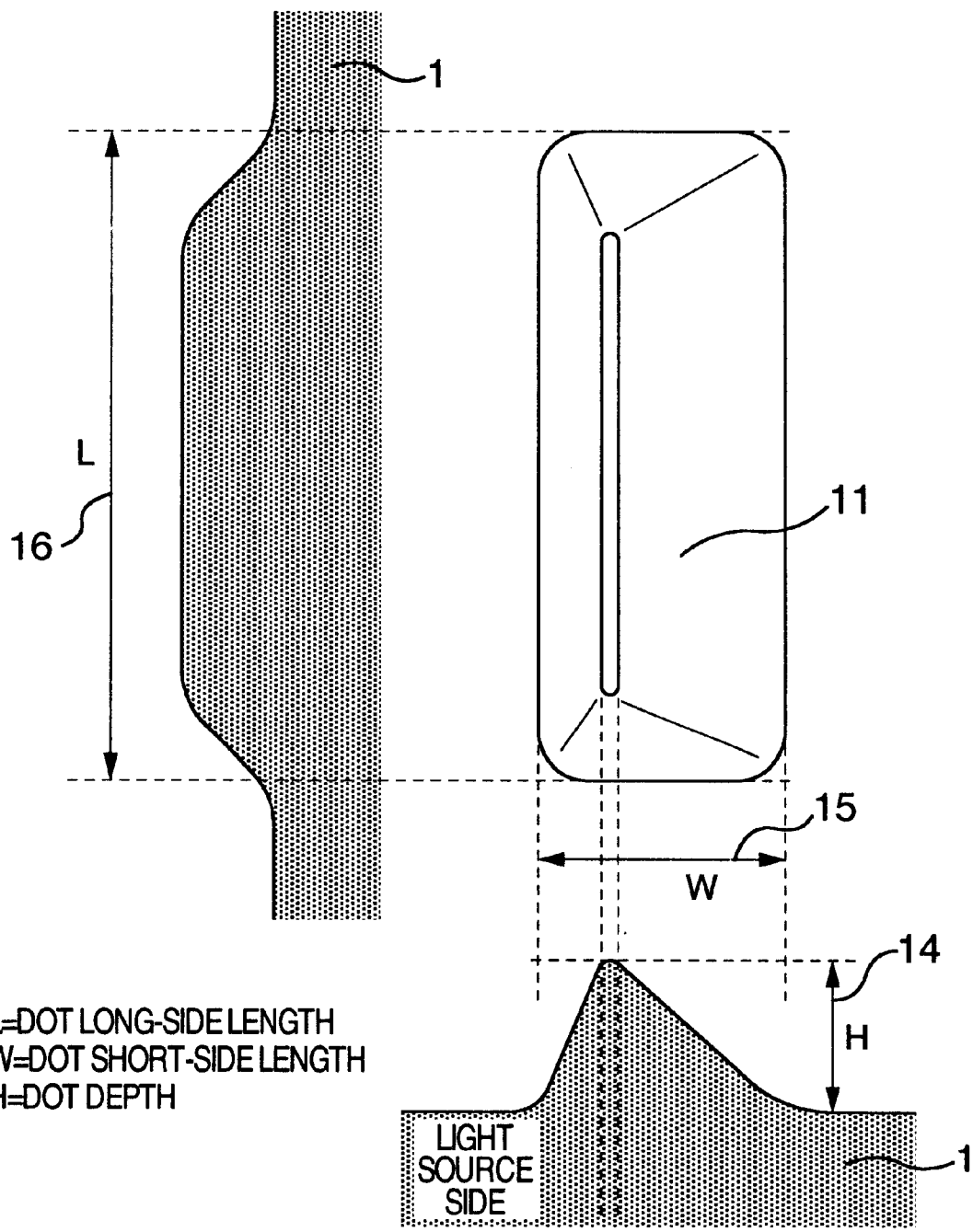
FIG. 4 is a sectional view and a plan view of a micro-dot (small protrusion portion)
Figure 5:
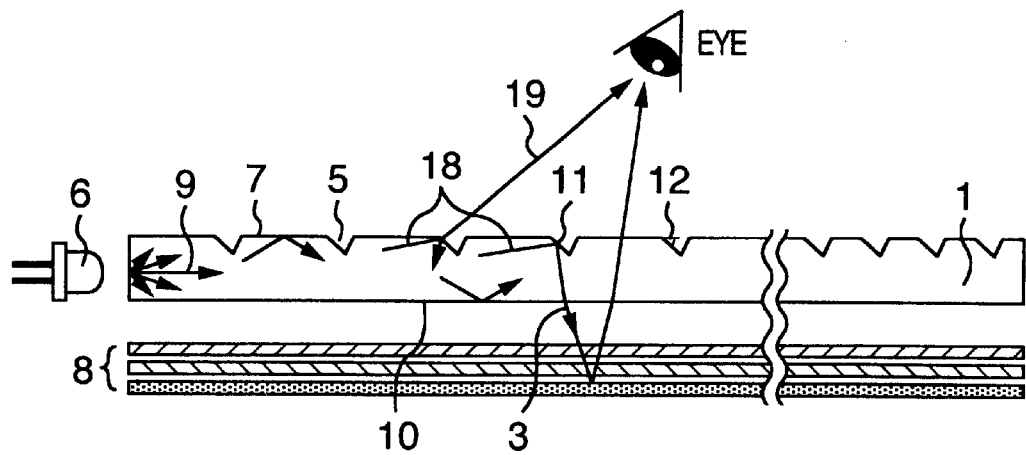
FIG. 5 is a view for explaining tracks of light propagated inside a light guide plate according to the first embodiment.

FIG. 3 shows a sectional view and a plan view of a micro-dot 5 which is a small recess portion by way of example. On the other hand, FIG. 4 is a sectional view and a plan view of a micro-dot 5 which is a small protrusion portion. In addition, FIG. 5 is a view for explaining the tracks of light propagated in the light guide plate in this embodiment.

Description will be made about the case where each of the micro-dots 5 is a small recess portion by way of example. The illuminator shown in FIGS. 3 and 5 is provided with light sources 6 and a light guide plate 1. In addition, as described above, the illuminator is disposed in front of a liquid-crystal display device 8, and the light sources 6 are disposed on one of side surfaces of the light guide plate 1. The micro-dots 5 each shaped as shown in FIG. 3 are formed on an upper surface 7 of the light guide plate 1. That is, as shown in FIG. 5, the micro-dots 5 are formed on the surface (the light-guide-plate upper surface 7) of the light guide plate 1 which does not face the liquid-crystal display device 8.

This dot arrangement is to use the micro-dots 5 to reflect the light 9 incident on the side surface of the light guide plate 1 toward the liquid-crystal display device 8. Specifically, in FIG. 6, the light exiting from the light source 6 enters, as the light-guide-plate incident light 9, the light guide plate 1 through an incidence end surface of the light guide plate 1 so as to form light-guide-plate guided light. The light-guide-plate guided light travels toward the other end surface of the light guide plate 1 while total reflection is repeated between a light-guide-plate lower surface 10 and the light-guide-plate upper surface 7.

Of the light-guide-plate guided light, the light 18 travelling to a reflection slope 11 of the corresponding micro-dot 5 is reflected by the slope so as to travel toward the light-guide-plate lower surface 10. The light reaching the light-guide-plate lower surface 10 exits from the light guide plate 1 while being refracted by the light-guide-plate lower surface 10. The refracted light enters the liquid-crystal display device 8 as illumination light.

Thus, by use of the light guide plate 1 described in this embodiment, the light from the light source 6 can be made to exit toward the liquid-crystal display device 8 efficiently.

At this time, when a sectional slope angle 12 of the corresponding micro-dot 5 is selected so that the light reflected by the micro-dot reflection slope 11 satisfies the condition of total reflection, the light 19 entering the eyes of the observer directly from the light guide plate 1 can be reduced. As a result, the quantity of the light made incident from the light guide plate 1 to the liquid-crystal display device 8 becomes so large that a reflection type liquid-crystal display device with good visibility can be realized.

The intensity of the light made to exit from the light source 6 is generally reduced in the light guide plate 1 as the distance from the light source 6 increases. Accordingly, the intensity of the light entering the liquid-crystal display device 8 can be uniformalized, for example, by changing the density of the micro-dots 5, that is, by changing the number of the micro-dots 5 per unit area, or by changing the size or length of the micro-dots 5 while keeping the density of the micro-dots 5 uniform, or by a combination of the aforementioned methods.

In the case of a single light source, it is preferable that the density of the micro-dots 5 is formed to increase, in accordance with the exponential function or power law, from the light-source-side end surface of the light guide plate toward the opposite end surface of the light guide plate.

Figure 6:
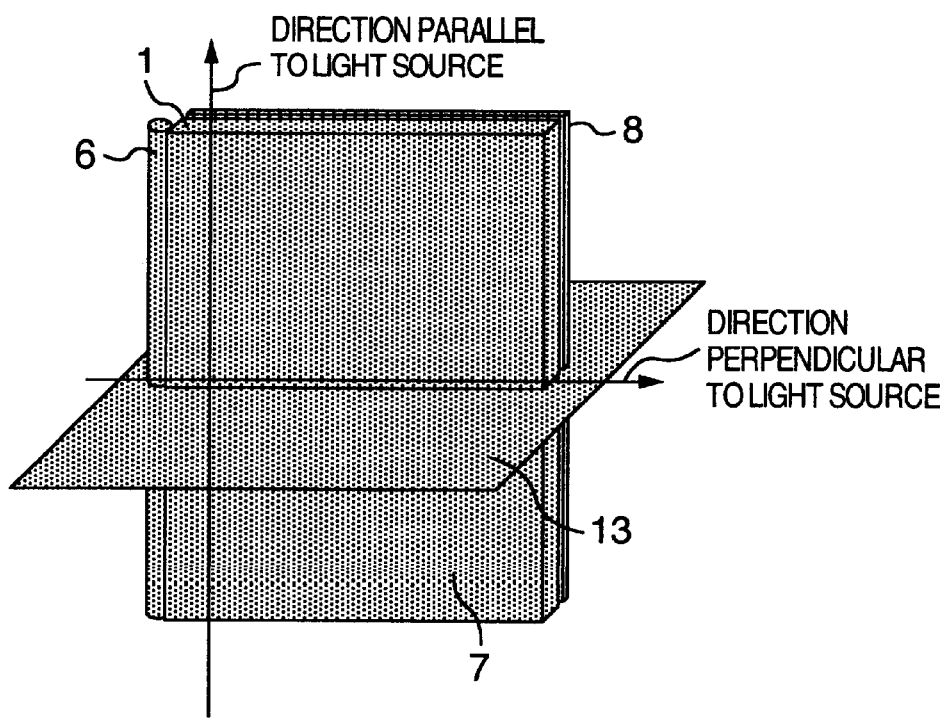
FIG. 6 is a conceptual view for explaining an arrangement of micro-dots.

The sectional shape of each of the micro-dots 5 is substantially perpendicular to the upper surface 7 of the light guide plate on which the micro-dots 5 are formed, as shown in FIG. 6. The sectional shape taken on a plane substantially in parallel with the travelling direction of the light entering the light guide plate 1 from the light source 6 (the travelling direction of the guided light in the light guide plate) is substantially a V-shape. The sectional inclination angle 12 is set to be in a range of from 35 to 43°, and the sectional vertex angle is set to be in a range of 70.6±2.5°. Incidentally, in the case of point light sources, it may be considered that there is a linear light source connecting those point light sources.

Figure 7A:
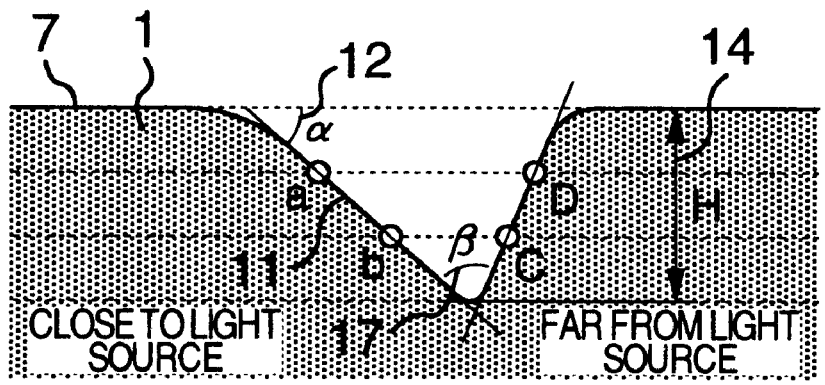
FIGS. 7A and 7B are views for explaining sectional inclination angles and sectional vertex angles of micro-dots respectively.
Figure 7B:
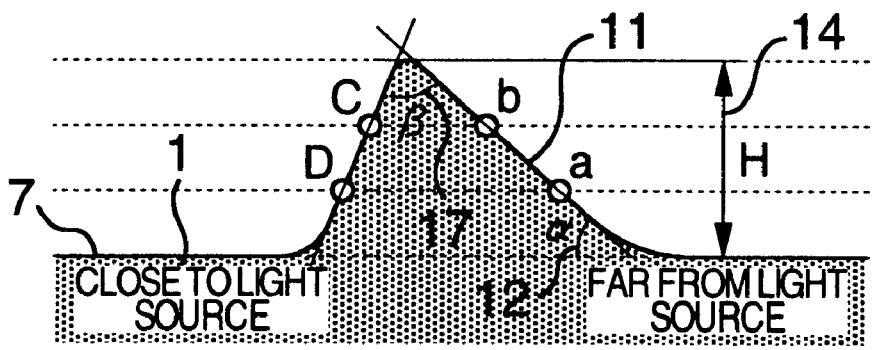

Here, the micro-dot reflection slope 11, the sectional inclination angle 12, dot depth (dot height) H, dot short-side length W15 and dot long-side length L16 are defined in FIGS. 3 to 4 and FIGS. 7A and 8B. That is, as shown in FIGS. 7A and 7B, the sectional inclination angle 12 is set to be an angle between the light-guide-plate upper surface 7 and a straight line connecting points a and b on the micro-dot reflection slope 11 when the micro-dot depth (height) H14 is divided to three equal parts. In addition, the vertex angle 17 is set to be an angle between the straight line connecting the points a and b and a straight line connecting points C and D on the micro-dot reflection slope 11.

The reason why the sectional inclination angle 12 is set to be in a range of from 35 to 43° is to reduce the light 2 (see FIG. 2) entering eyes directly from the light guide plate 1 and to increase the quantity of the light entering the liquid-crystal display device 8 so as to improve the visibility of the liquid-crystal display device 8.

That is, as shown in FIG. 5, light with a divergent angle within about ±35°, more particularly within about ±25° with respect to the horizontal direction in which the light is travelling is generally propagated inside the light guide plate 1. The light incident on the reflection slope 11 of the micro-dot 5 is reflected and refracted by the slope 11. Of the reflected and refracted light, the reflected light changes its travelling direction downward and exits from the light-guide-plate lower surface 10 so as to function as illumination light for the liquid-crystal display device 8.

On the other hand, the light refracted and transmitted by the reflection slope 11 of the micro-dot 5 exits from the upper surface 7 of the light guide plate 1 without entering the liquid-crystal display device 8. Thus, the light enters the eyes of the observer. Therefore, the observer directly views the light from the light sources 6 so as to form a bright spot or a bright line, which lowers the value as a liquid-crystal display device. Further, since the aforementioned light does not illuminate the liquid-crystal display device 8, the utilization efficiency of the light from the light sources 6 is reduced.

It is therefore necessary to set the sectional inclination angle 12 so that reflection by the light-source-side slope of the micro-dot 5 satisfies the total reflection condition to the utmost. As a result, it is possible to utilize the light from the light sources 6 largely for illuminating the liquid-crystal display device.

Figure 8A:
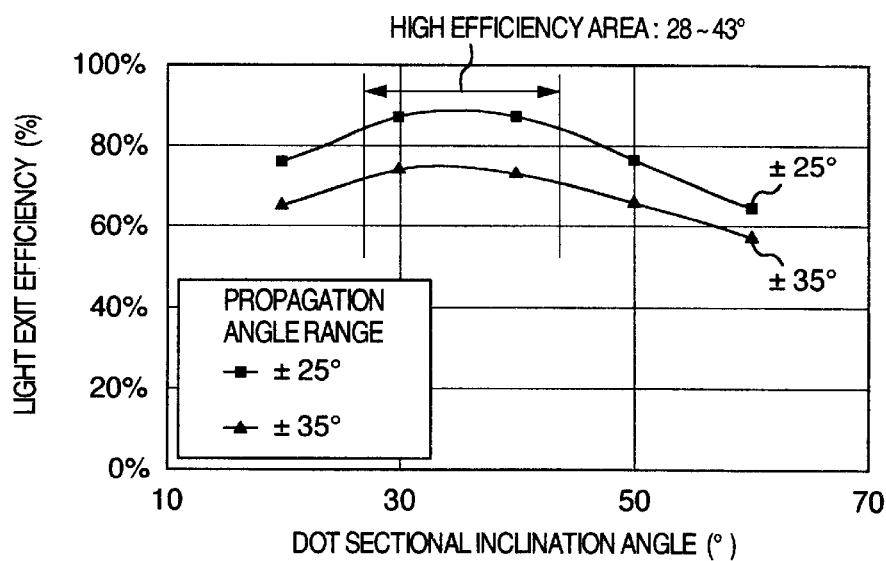
FIG. 8A is a graph showing a relationship between the sectional inclination angle of the micro-dots and efficiency of the light made to exit from the light guide plate.
Figure 8B:
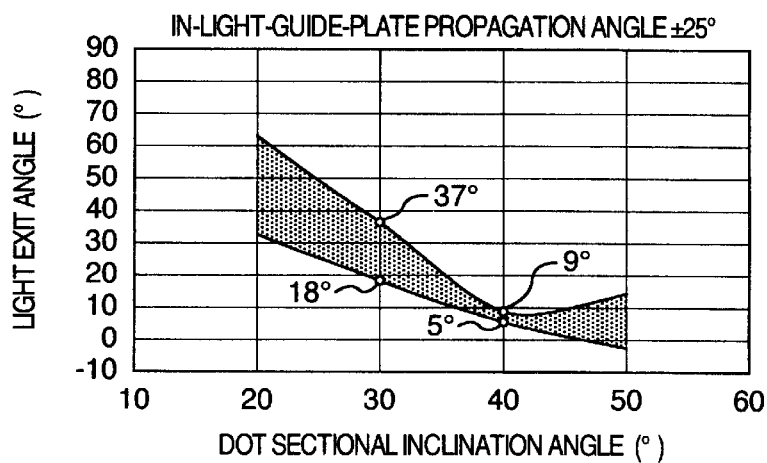
FIG. 8B is a graph showing a relationship between the sectional inclination angle of the micro-dots and the exiting angle of the light made to exit from the light guide plate when the angle of the light propagated inside the light guide plate is in a range of ±25°.
Figure 8C:
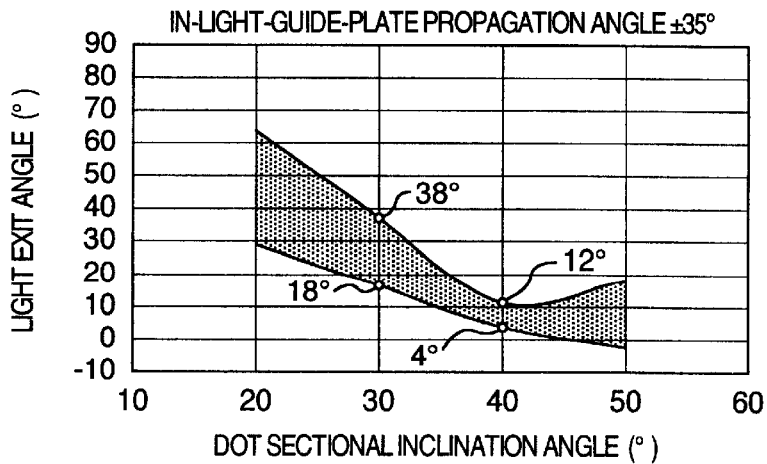
FIG. 8C is a graph showing a relationship between the sectional inclination angle of the micro-dots and the exiting angle of the light made to exit from the light guide plate when the angle of the light propagated inside the light guide plate is in a range of ±35°.

FIG. 8A shows the relationship between the sectional inclination angle and the efficiency when the light from the light sources is made to exit from the light-guide-plate lower surface. On the other hand, FIGS. 8B and 8C show the relationship between the sectional inclination angle and the range (half width) of the exiting angle of the light made to exit from the light-guide-plate lower surface. Incidentally, in each case, the propagation angle with which light travels while reflected by the upper and lower surfaces of the light guide plate was varied within ±35°, and more particularly within ±25°.

As is apparent from the result of FIG. 8A, when the propagation angle of light is in a range between ±35° and the sectional inclination angle is in a range of from 28 to 43°, the exiting efficiency of the light from the light guide plate can be made large.

Figure 9A:
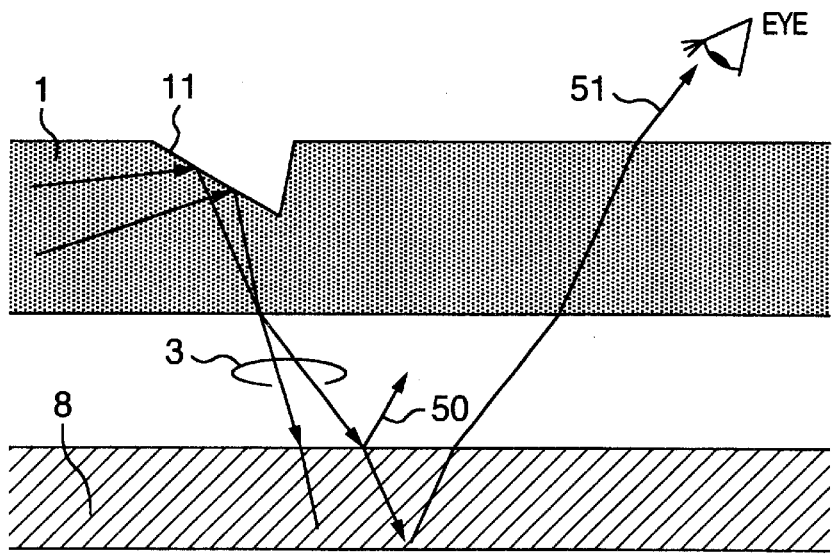
FIGS. 9A and 9B are views for explaining the influence of the range of the exiting angle of the light made to exit from the light guide plate, respectively.

However, if the sectional inclination angle is not larger than 35°, the exiting angle of the light made to exit from the light-guide-plate lower surface becomes large. This large exiting angle is the main cause of lowering of the contrast of the liquid-crystal display device and of lowering of the frontal luminance of the liquid-crystal display device. That is, if the sectional inclination angle is about 30°, the exiting angle of the light 3 made to exit from the light-guide-plate lower surface is in a range of from 18 to 38° (see FIGS. 8B and 8C), the light 50 reflected by the light-guide-plate-1-side surface of the liquid-crystal display device 8 is apt to be produced as shown in FIG. 9A, so as to cause the lowering of the contrast. Further, the exiting angle of the display light 51 from the liquid-crystal display device with respect to the liquid-crystal display device is apt to increase. Thus, the frontal luminance is lowered.

Figure 9B:
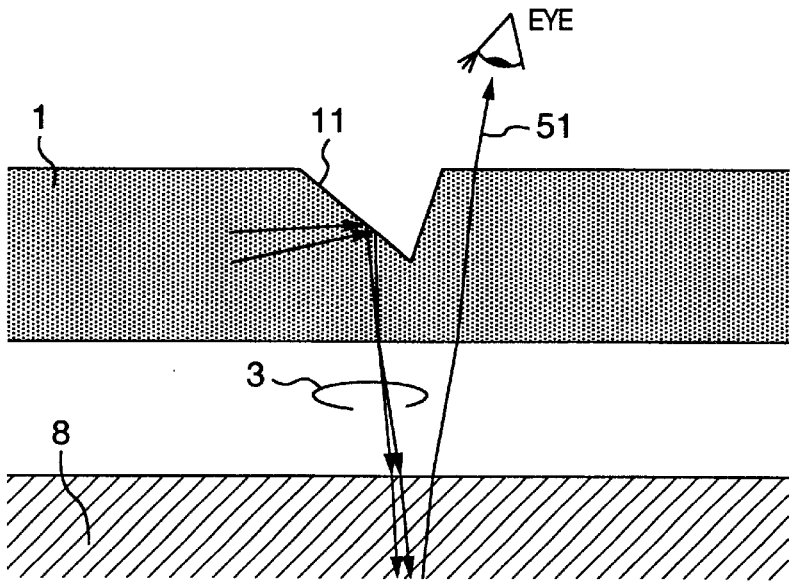

On the contrary, if the sectional inclination angle is about 40°, as shown in FIG. 9B, the exiting angle of the light 3 made to exit from the light-guide-plate lower surface is in a range of from 5 to 9° (see FIG. 8B) or in a range of from 4 to 12° (see FIG. 8C). As a result, the light 3 is difficult to be reflected by the light-guide-plate-1-side surface of the liquid-crystal display device 8 so that the contrast is enhanced. Further, since the exiting angle of the display light 51 from the liquid-crystal display device with respect to the liquid-crystal display device is also reduced, the frontal luminance is enhanced.

When the sectional inclination angle is set to be not smaller than 43°, the light exiting angle becomes small, but the light exiting efficiency is reduced as shown in FIG. 8A. This is because the total reflection condition is not satisfied at the time of reflection by the micro-dot reflection slope 11. Accordingly, the light 2 entering the eyes of the observer directly from the light guide plate as shown in FIG. 2 increases undesirably to be the main cause of lowering of the visibility.

From the above points, a preferable angle as the sectional inclination angle is in a range of from 35 to 43° in which the light exiting angle is small, the range of the exiting angle is narrow and there is no reduction in the exiting efficiency.

Although the sectional inclination angle was set to be in a range of from 35 to 43° in this embodiment, it is more preferable that the sectional inclination angle is set to be in a range of 39 to 42° in which the range of the light exiting angle becomes minimal and optical design becomes easy.

Incidentally, the propagation angle of the light propagated inside the light guide plate 1 is generally about 35° when a cathode-ray tube and a reflector are used as the light source 6. Alternatively, if a light emission diode is used as the light source 6, the propagation angle is approximately in a range between ±35° though it depends on the lens design of the light emission diode, and so on. It is therefore important to determine a suitable sectional inclination angle in accordance with the kind of the light source in consideration of the results of FIGS. 8A to 8C and FIGS. 9A and 9B.

Figure 10A:
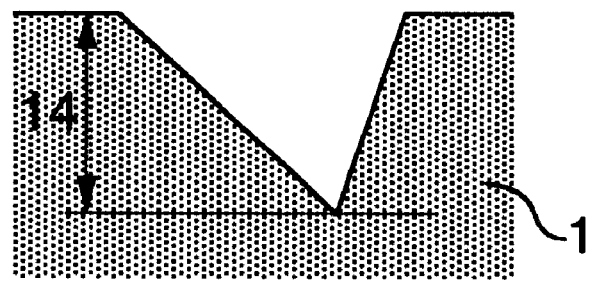
FIGS. 10A to 10C are views for explaining sectional shapes of micro-dots respectively.
Figure 10B:
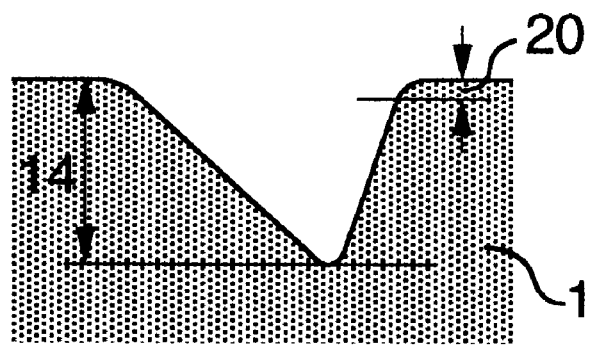
Figure 10C:
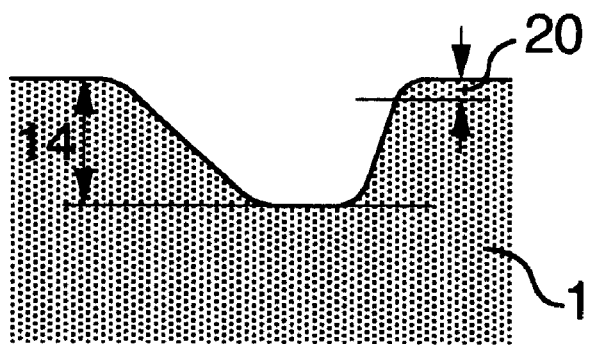
Figure 11A:
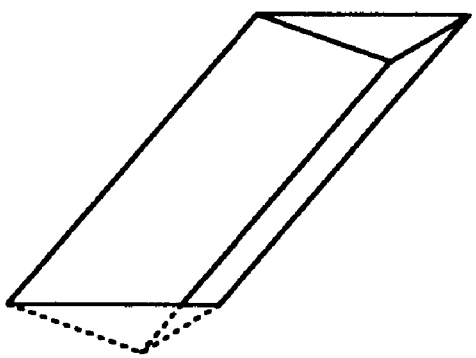
FIGS. 11A to 11D are views for explaining other forms of the micro-dot respectively.
Figure 11C:
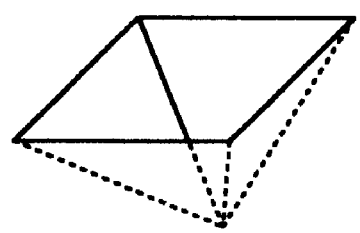
Figure 11B:
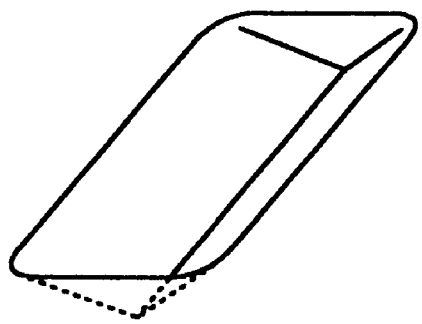
Figure 11D:
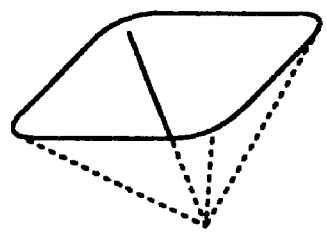

On the other hand, the reason why each of the micro-dots 5 is formed into a substantially V-shape in section is to reduce the haze (turbidity or cloudiness) of the light guide plate 1. Then, as shown in FIGS. 10A to 10C, respectively, the substantially V-shape includes a V-shape, a V-shape rounded at the vertex and a substantially U-shape, which are formed so that an R portion 20 of the micro-dot 5 is not larger than about 20% of the dot depth (height) H14.

With such a sectional shape, slopes which do not contribute to reflection are reduced to the utmost (the area viewed from the light-guide-plate upper surface 7 is small) when the light entering the light guide plate is reflected by the reflection slopes.

It is preferable that the vertex angle of the sectional shape of each micro-dot 5 is set to be in a range of 70.6±2.5°. This is because a mold for forming micro-dots in the light guide plate can be produced easily by use of anisotropic etching technique of silicon single crystal as will be described later.

In addition, it is preferable that the plan shape of each micro-dot is formed to be substantially rectangular. Here, the substantially rectangular shape includes a rectangle and a rectangle rounded at its corners. Alternatively, the shape may be a square. Particularly, when the shapes of the micro-dots 5 are substantially rectangular, scattered light inside the light guide plate 1 is reduced so that the light exiting efficiency or the like is enhanced. At the same time, the area of slopes which do not contribute to reflection in the micro-dots 5 is reduced in comparison with that in the case of a circular shape or the like. As a result, there is an effect of reducing the haze of the light guide plate.

Incidentally, although description was made in the aforementioned embodiment about the case where the micro-dots 5 were small recess portions, effects similar to those in the aforementioned case can be obtained even if each micro-dot has a protrusion portion as shown in FIG. 4, or a square pyramidal or wedge shape as illustrated in FIGS. 11A to 11D.

Next, description will be made about the arrangement of the micro-dots.

Figure 12A:
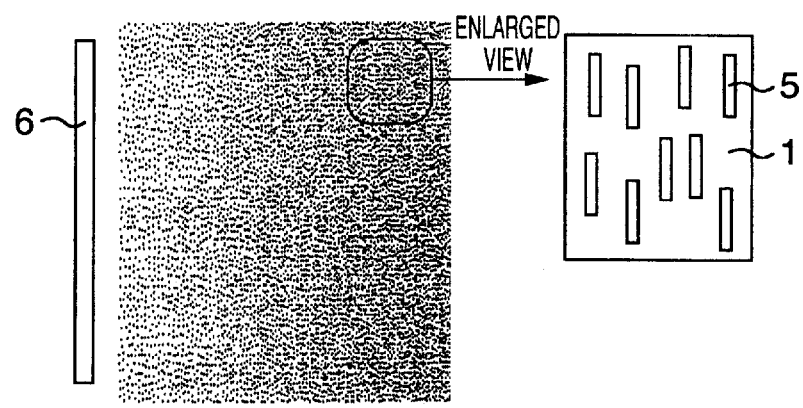
FIGS. 12A to 12C are views for explaining a method for arranging the micro-dots.
Figure 12B:
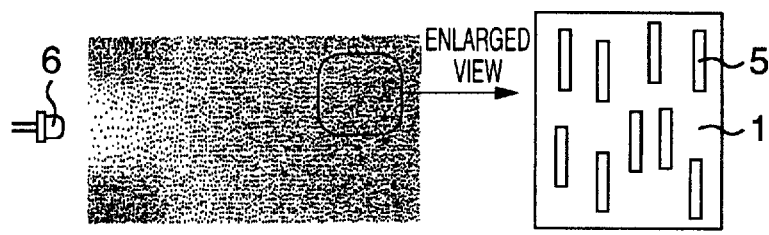
Figure 12C:
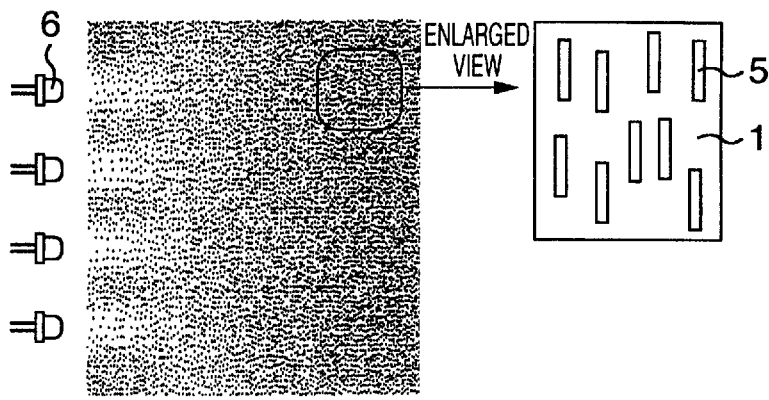

The dot arrangement is preferably made so that the long-side direction of each dot 5 is substantially parallel with the longitudinal direction of a cathode-ray tube or the like serving as the light source 6 as shown in FIG. 12A. Alternatively, if a single point light source such as a light emission diode is used as the light source 6, it is preferable that the long-side direction of each dot 5 is made substantially parallel with a tangential direction of a circle around the point light source as shown in FIG. 12B. If a plurality of point light sources such as light emission diodes are used as the light sources 6, the long-sidle direction of each dot 5 is made substantially parallel with a straight line connecting the plurality of point light sources 6 as shown in FIG. 12C.

The reason is as follows. Most of the light beams entering the light guide plate 1 from the light sources 6 travel substantially perpendicularly to the longitudinal direction of the light sources 6. After the light beams are incident on the slopes 11 of the micro-dots 5, they are reflected by the reflection slopes 11 to be thereby made to exit from the lower surface 10 of the light guide plate. Therefore, the above-mentioned arrangement of the micro-dots is the most efficient.

Next, description will be made about the dimensions of the micro-dots 5.

Approximately, the short-side length W15 of each of the micro-dots 5 is, for example, in a range of from 0.002 to 0.05 mm, and the long-side length L16 thereof is, for example, in a range of from the short-side length to 0.2 mm, that is, in a range of from 0.002 to 0.2 mm.

This is because, for example, in the case where original shapes of the micro-dots are formed by use of a well-known photolithographic method, it is difficult to form each of the micro-dots with a desirable profile if the length of the micro-dot is not longer than 0.002 mm.

That is, the profiles of the micro-dots become irregular or the surface accuracy of the dots in section is lowered due to the lowering of the resolution of a photo mask, the resolution of exposure or development, etc. As a result, the scattering of the light propagated inside the light guide plate becomes so great that it becomes difficult to obtain a light guide plate which is high in light utilization efficiency.

On the other hand, the reason why an upper limit of the short-side length W15 of each of the micro-dots 5 is set to 0.05 mm is that naked eyes have a visual limit of about 0.05 mm.

That is, if the short-side length of each of the micro-dots is not smaller than 0.05 mm, the micro-dots themselves can be recognized, for example, even with naked eyes (there occurs a phenomenon that the micro-dots 5 can be seen with naked eyes, that is, a phenomenon that the light guide plate looks like an aggregate of point light sources) so that the visibility as the liquid-crystal display device using the micro-dots is deteriorated.

On the other hand, the reason why the long-side length of each of the micro-dots 5 is set to be not shorter than the short-side length thereof is to increase the area of the reflection slopes 11 of the micro-dots. Thus, propagated light can be reflected effectively toward the liquid-crystal display device without increasing the number of micro-dots 5 to be formed on the surface of the light guide plate 1.

In addition, the reason why the long-side length of each of the micro-dots 5 is set to be not longer than 0.2 mm is as follows. If the long-side length of each micro-dot 5 is longer than 0.2 mm, the micro-dots 5 themselves can be recognized with naked eyes to thereby spoil the visibility as the liquid-crystal display device. Further, in the case where density distribution is applied to the way of arrangement of the micro-dots 5, it is difficult to give a gradient to the density distribution if the long-side length of each of the micro-dots 5 is not shorter than 0.2 mm. As a result, uniform distribution of illumination light cannot be obtained.

Next, description will be made about the depth H14 of the micro-dot 5.

The depth H14 of each of the micro-dots 5 is defined automatically based on the dot short-side length W15 and the sectional inclination angle 12. It is, however, necessary to select the dot short-side length W15 and the sectional inclination angle 12 so that the depth H14 is in a range of from 0.002 to 0.04 mm. That is, when the dot depth H14 is not larger than 0.002 mm, the area of the reflection slope 11 of the dot 5 becomes so small that the function of changing the travelling direction of the light incident on the light guide plate 1 is lost to reduce the utilization efficiency of light with which the liquid-crystal display device 8 is irradiated.

On the other hand, when the depth W14 of the dot 5 is set to be not smaller than 0.04 mm, the quantity of irradiation from the light guide plate 1 increases in an area near the light source 6, so that uniform irradiation becomes difficult.

Next, description will be made about the arrangement of the micro-dots 5.

In conclusion, it is desirable that the micro-dots 5 are arranged with no regularity. This is because the micro-dots 5 described in this embodiment are extremely minute so that the irregular arrangement of the micro-dots 5 is necessary for prevention of a moire phenomenon from occurring due to the interference of the micro-dots 5 with a regularly formed pattern of a member constituting the liquid-crystal display device 8, for example, represented by a liquid-crystal cell, a color filter, a TFT pattern, a black matrix, etc.

Particularly, when the illuminator is disposed in front of the liquid-crystal display device 8 in use, there is no diffusing plate, which would be often used on normal occasions, between the light guide plate 1 and the observer. Therefore, it is an extremely important problem to prevent such a moire phenomenon.

Figure 13:
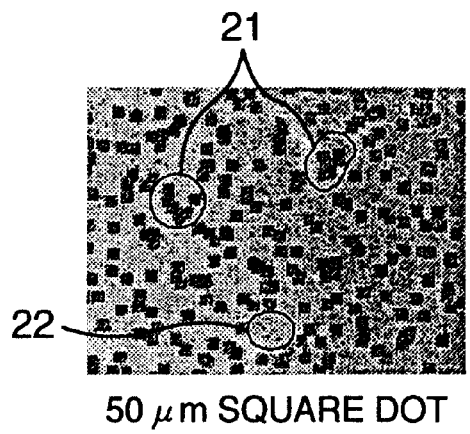
FIG. 13 is a view for explaining a problem in the arrangement of micro-dots.

However, when the micro-dots 5 are arranged simply with irregularity, it is easy to produce a cluster 21 of micro-dots 5 or an area 22 where there is no micro-dot 5, as illustrated in FIG. 13. As a result, the visibility as the liquid-crystal display device may be deteriorated.

It is therefore preferable that a radial distribution function similar to the case described in JP-A-10-1537519 is used to form the micro-dots so as to satisfy the following conditions.

That is, in the light guide plate 1, the surface on which the micro-dots 5 are formed is sectioned into 0.25 to 1 mm$^2$ square areas over an area not smaller than 95% of the aforementioned surface on which the micro-dots 5 are formed. In each of the square areas, the dots 5 are formed and disposed so that a function G(R) which is obtained by taking a weighted average of a radial distribution function g(R) obtained for each dot in accordance with the arrangement relationship of the dots, and which is obtained by approximating the weighted average by a least squares method satisfies the relation of $0<S_1/S_2<0.2$ in a range of $R/R_0=3$ to 6;

provided that R designates a distance from a central position of one dot to a central position of another dot; $R_0$, a value obtained by dividing a length of one side of the square area by a square root of the number of the dots existing in the square area; $S_1$, a value obtained by integrating a difference between G(R) and an average value of G(R) with $R/R_0$ which is in a range of from 3 to 6; and $S_2$, a value obtained by integrating the average value of G(R) with $R/R_0$ which is in a range of from 3 to 6.

The reason why the aforementioned arrangement is required in an area not smaller than 95% of the surface on which the micro-dots 5 are formed is that a measure to prevent moire is required in the aforementioned area because the dots themselves may be observed directly when the illuminator is disposed in front of the liquid-crystal display device. Thus, the visibility as the liquid-crystal display device can be ensured.

The area of each square is determined to include, preferably, at least 10 micro-dots 5, more preferably at least 50 micro-dots 5 in the square area. That is, if the area of the square is not larger than 0.25 mm$^2$, the number of dots included in the square area is too small to calculate the radial distribution function g(R) because the value of $R_0$ is usually approximately in a range of from 0.01 to 0.2 mm.

On the contrary, if the area of the square is set to be not smaller than 1 mm$^2$, the quantity of the light radiated from the light guide plate 1 cannot be estimated correctly when the dot density distribution is changed to correct the light quantity. Thus, it may be difficult to correct the light quantity.

TABLE 1

Relationship between S1/S2 Value and Moire Occurrence

| item | Absolute random-number arrangement method | | | | | |
|---|---|---|---|---|---|---|
| overlap constraint | no | no | 0.02 mm | 0.02 mm | 0.03 mm | 0.04 mm |
| S1/S2 | 0.8 | 0.5 | 0.5 | 0.3 | 0.2 | 0 |
| moire | ◎ | ◎ | ◎ | ◎ | ◎ | ◎ |
| dot overlap | × | × | × | Δ | ○ | ◎ |
| dark/bright Spot | × | × | ○ | ○ | ○ | ◎ |
| total valuation | × | × | × | Δ | ○ | ◎ | dot dimensions 0.01 × 0.08 mm

Table 1 shows the results of investigation about the relationship between the production of moire and the aforementioned coefficients, while the range of the value $S_1/S_2$ was determined on the basis of the result described above. Further, the function G(R) is set to be substantially 0 in the range of R<(short-side length of dot)×2. This setting is to prevent dot overlap, which is produced when dots are close to each other, from being observed.

Incidentally, the overlap constraint in Table 1 is a method for defining a shortest distance between dots adjacent to each other so as to make the function G(R) substantially 0 in the range of R<(short-side length of dot)×2.

Since the dot short-side length is 0.01 mm in this embodiment, the function G(R) can be made substantially 0 in the range of R<(short-side length of dot)×2 if the shortest distance between dots adjacent to each other is set to be not shorter than 0.02 mm. The "spot" is that which is obtained by judgement as to whether a dark area where dots overlap with each other or a bright area where there is no dot is generated and can be visually confirmed or not.

Figure 14:
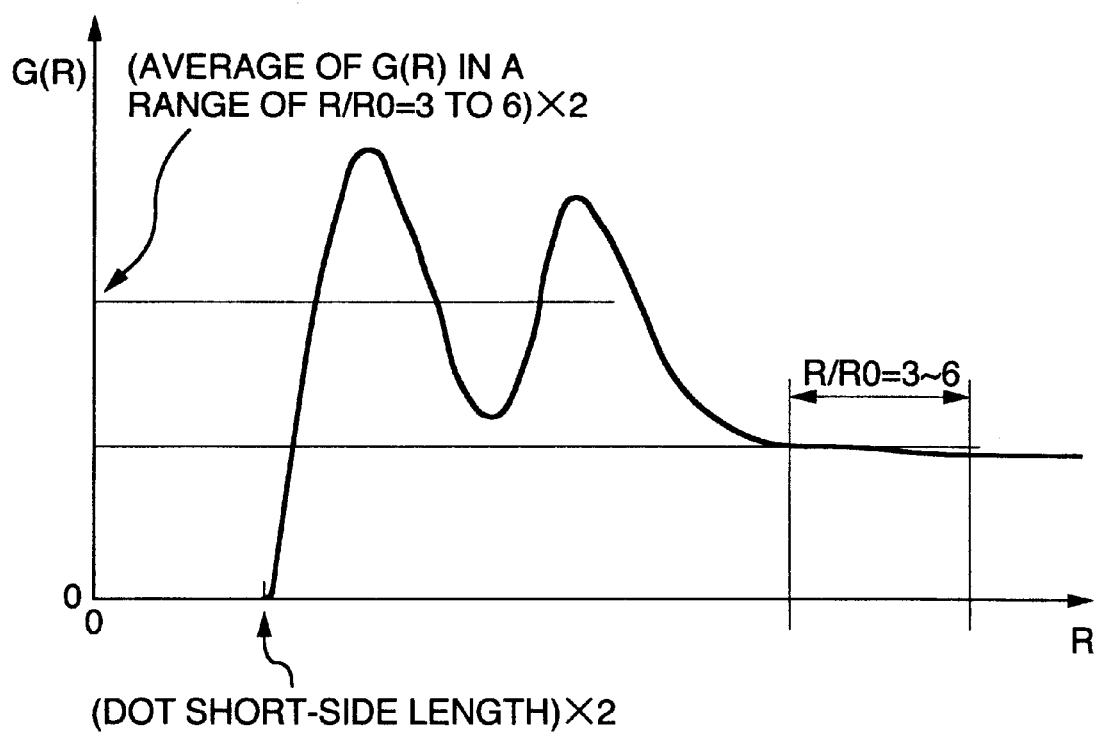
FIG. 14 is a graph for explaining a distribution of a radial distribution function G(R)

Further, FIG. 14 shows the relationship between the function G(R) and the distance R. As is apparent from this result, the aforementioned dots are arranged so that at least two peaks each of which is at least twice as large as the average value of the function G(R) exist in the function G(R) in a range of $R/R_0$=3 to 6. The reason for such dot arrangement is that, in the case where substantially rectangular dots are used, the dot density is easily enhanced if the dot interval on the short side is made shorter than the dot interval on the long side.

On the other hand, the reason why each of the peaks is made at least twice as large as the average value of the function G(R) in a range of $R/R_0$=3 to 6 is that, by adding such a condition, the distance (position relationship) between dots adjacent to each other can be kept substantially constant so that the production of a cluster of dots or the production of an area where there is no dot can be prevented.

Next, description will be made about the method for manufacturing the light guide plate according to this embodiment.

Fundamentally, a mold is first manufactured and, the light guide plate is then manufactured by performing plastic molding with the mold. At this time, as the method for manufacturing the mold, various well-known machining methods, such as drilling, cutting, grinding, etc., may be used. Alternatively, an electrical discharge machining method is also effective.

The number of micro-dots is in a range of from 200 to 20,000 pieces/cm$^2$ in this embodiment, and hence it exceeds 1,000,000 pieces in total on the whole surface of the light guide plate. Therefore, it should be, however, regarded as very difficult to form such a large number of micro-dots by the aforementioned manufacturing method.

FIGS. 15A to 15G show a process of forming a mask pattern on a silicon substrate, and FIGS. 15H–15M show a process of forming micro-dots by use of an anisotropic etching method.

This manufacturing method has the steps of:

(A) cutting a silicon substrate 30 out of a silicon single crystal ingot 29 so that the silicon substrate 30 has a predetermined crystal plane;

(B) forming a silicon oxide film 31 on the surface of the silicon substrate 30 by use of a well-known method;

(C) forming a photo-resist film 32 on the silicon oxide film 31;

(D) disposing a photo mask 33 having a micro-dot pattern on the silicon substrate 30, and irradiating the resist film 32 with ultraviolet rays (UV) from above the mask 33 to thereby expose the resist film 32;

(E) developing the resist film 32, and forming a pattern 34 of micro-dots on the silicon oxide film 31;

(F) pasting a protective tape 35 on the silicon oxide film 311 which is formed on the back surface of the silicon substrate 30, and removing the silicon oxide film 31 from portions of the silicon substrate 30 other than the back surface by a well-known etching method;

(G) removing the resist film 32;

(H) anisotropically etching the silicon substrate 30 with the pattern 34 of the silicon oxide film 31 serving as a mask;

(I) removing the protective tape 35 and the silicon oxide film 31;

(J) forming a plating undercoat film 36 on the etched surface of the silicon substrate 30 by use of a well-known method;

(K) forming a plating film 37 by use of a well-known plating method with the plating undercoat film 36 serving as an electrode;

(L) stripping the plating film 37 off, and producing a stamper 38 having the micro-dot pattern 34;

then, performing abrasion on the micro-dot surface of the stamper 38 and the back surface thereof in accordance with necessity (not-shown); and (M) installing the stamper 38 in a well-known molding machine, and forming a light guide plate 1 by an injection molding method.

The respective steps will be described below in detail.

First, the step of cutting the silicon substrate 30 out of the silicon single crystal ingot 29, as shown in the step (A), is one of the most important steps in the manufacturing method.

When micro-dots each having a substantially V-shape in section are formed on the surface of the light guide plate 1, differences in etching speed in accordance with crystal orientations of silicon crystals as shown in Table 2 are utilized. That is, even if etching is performed on a crystal with any crystal plane as the silicon substrate 30, a (111) plane for which the etching speed is lowest is finally set to have reflection slopes of the micro-dots formed.

TABLE 2

Etching Speed of Anisotropic Etching

| Crystal plane | Etching speed (m/sec) |
|---|---|
| 100 | 1.05E−05 |
| 110 | 2.15E−05 |
| 210 | 2.06E−05 |
| 211 | 1.64E−05 |
| 221 | 9.77E−06 |
| 310 | 1.80E−05 |
| 311 | 1.78E−05 |
| 320 | 2.14E−05 |
| 331 | 1.41E−05 |
| 530 | 2.12E−05 |
| 540 | 2.14E−05 |
| 111 | 1.50E−07 |

KOH 20 wt % 80°

By utilization of such a crystal characteristic, it is possible to form micro-dots each of which has an optional sectional inclination angle and has a substantially V-shape in section and the plan shape of which is substantially rectangular.

Figure 16A:
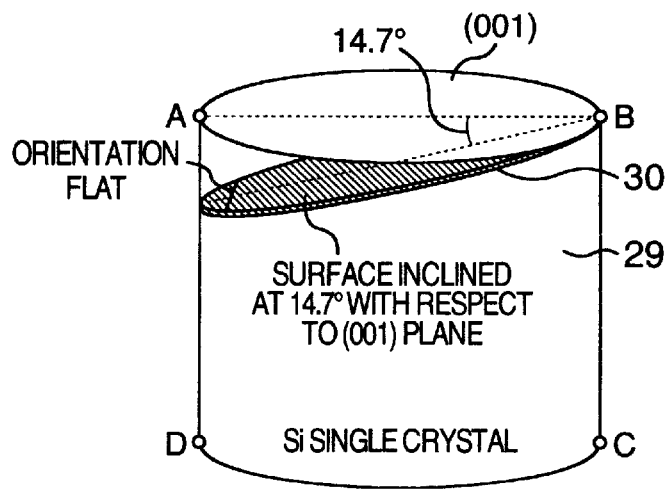
FIGS. 16A and 16B are views for explaining the production of a silicon substrate having a predetermined crystal plane, respectively.
Figure 16B:
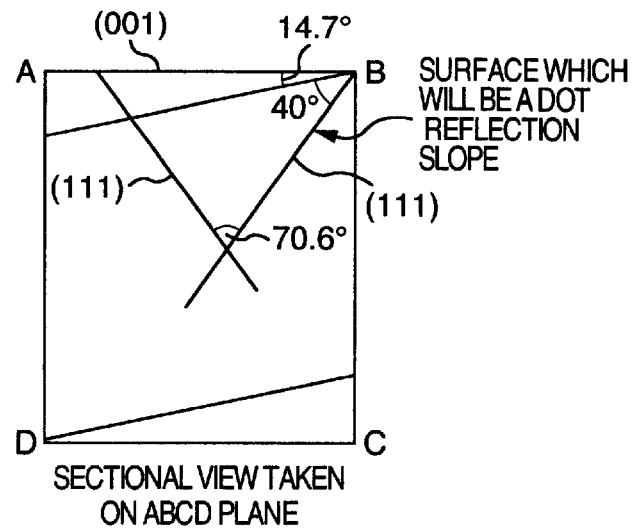
Figure 17:
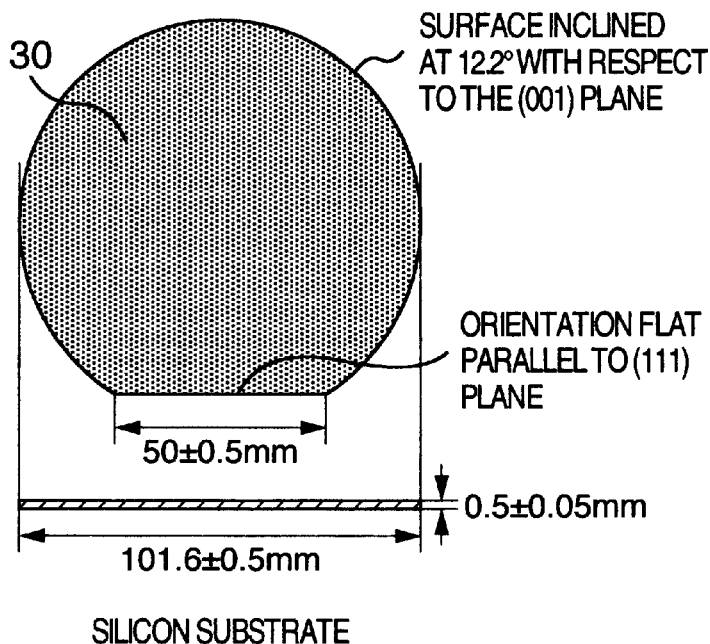
FIG. 17 is an explanatory view of the silicon substrate having the predetermined crystal plane.

FIG. 16A is a view showing a method for cutting out a crystal when the sectional inclination angle is 40° In this embodiment. FIG. 16B is a schematic view of the silicon substrate 30 cut out. FIG. 17 is a plan view of the silicon substrate 30 cut out.

By performing anisotropic etching on this silicon substrate 30, it is possible to form micro-dots having a predetermined sectional inclination angle shown in FIG. 16B by way of example. Here, by changing the angle with which the silicon substrate 30 is cut out, the silicon substrate 30 can be manufactured to have an optional crystal plane. As a result, as described above, it becomes possible to manufacture the silicon substrate 30 having a desirable sectional inclination angle in accordance with the kind of light source. In addition, the crystal plane of the silicon single crystal is not limited to the (001) plane. A silicon single crystal having an optional crystal plane may be used. Further, a silicon single crystal with a desired crystal plane determined at the beginning may be manufactured and used.

For the step of forming the silicon oxide film 31 which is used as a mask in anisotropic etching on the surface of the silicon substrate 30, as shown in the step (B), various methods may be used. In this embodiment, al well-known thermal oxidation method was used. Table 3 shows an example of thermal oxidation conditions.

TABLE 3

Example of Anisotropic Etching Process

| | Step | Conditions |
|---|---|---|
| 1 | Forming thermally-oxidized film on Si wafer | temperature: 1,000° C., water temperature: 90° C. film thickness: 0.0005 mm, 31 min |
| 2 | Baking before resist coating | nitrogen atmosphere, 140° C. 30 min |
| 3 | Photo-resist coating | OFPR-8600 10 cp 1,000 rpm film thickness: 0.001 mm |
| 4 | Pre-baking | nitrogen atmosphere, 90° C. 30 min |
| 5 | Exposure/development | exposure: 50 mJ developer: NMD-3 |
| 6 | Post-baking | nitrogen atmosphere, 140° C. 30 min |
| 7 | Oxygen plasma ashing | 800W 400 sccm 3 min 45 s |
| 8 | Oxide film etching | dip HF: NH$_4$F = 1:7 etching time: 6 min |
| 9 | pasting protective film on back surface | film made by Nitto Electric Industrial Co., Ltd. |
| 10 | removing photo-resist | S502A stripping liquid 110° C. 10 min |
| 11 | Si anisotropic etching | 20 wt % KOH 1.5 hr |
| 12 | removing oxide film | dip HF: NH$_4$F = 1:7 etching time: 6 min |
| 13 | washing/drying | vapor washing: 5 min |
| 14 | forming thermally-oxidized film again | Temperature: 1,000° C., water temperature 90° C. film thickness: 0.001 mm, 60 min |

Next, in the step (C) of forming the photoresist film 32 on the silicon oxide film 31, it is preferable that a primer is applied to the silicon oxide film 31 as a pre-process so as to improve the adhesion to an undercoat film. As a proper method for the primer treatment, various methods may be used. For example, when a silane agent is used as the primer, hexamethylsilazane is suitable. That is, a so-called gaseous diffusion process is used so that the hexamethylsilazane is supplied to a vessel and evaporated to form a thin film on the substrate surface. Thus, a uniform film can be formed on the silicon oxide film 31.

Figure 15A:
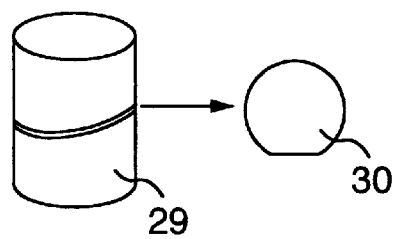
FIGS. 15A to 15G are views showing a flow of steps of a method for manufacturing a light guide plate having micro-dots, up to the step of forming a dot pattern.
Figure 15B:
Figure 15C:
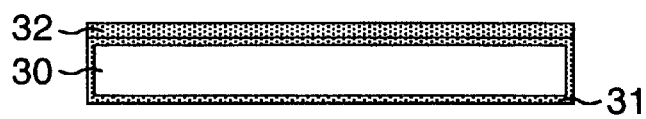
Figure 15D:
Figure 15E:
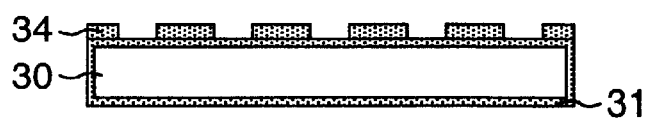
Figure 15F:
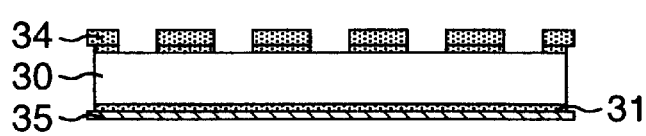
Figure 15G:

As the photo-resist material, for example, a fluid-like or film-like positive type or negative type material may be used. In FIG. 15C, a positive type material was formed by use of a well-known spin-coating method.

In the step (D), for example, a chromium mask, a film mask, an emulsion mask, etc. may be used as the photo mask. Data such as the size and number of designed micro-dots, the distribution thereof, and so on, are prepared in advance. A pattern of the micro-dots is drawn, for example, by use of an electron beam method, a laser beam method, or the like. This pattern is used as the mask.

In the steps (E) to (G), exposure, etching of the silicon oxide film 31, and removal of the resist film 32 are performed by well-known methods respectively.

By the above steps, the silicon substrate 30 having a predetermined micro-dot pattern in the silicon oxide film 31 is completed.

Next, as shown in the step (H), anisotropic etching is performed on the silicon substrate 30 with the pattern of the silicon oxide film 31 serving as a mask. Table 3 shows an example of etching process conditions. A KOH solution the KOH concentration of which was about 20% was used as etching liquid. In such conditions, micro-dots having a V-shape in section with a sectional inclination angle of about 40° were formed on the surface of the silicon substrate 30.

Succeedingly, in the step (I), the protective tape 35 formed on the back surface of the silicon substrate 30, and the silicon oxide film 31 are removed by use of a well-known method. Then, a plating layer (stamper) is formed by a plating method shown in the steps (J) and (K). Incidentally, if the undercoat film 36 is formed on the silicon substrate 30 having the micro-dots 30 in advance, unevenness of the plating film can be reduced in the plating step so that a superior plating layer, that is, a superior stamper can be formed.

Although the aforementioned undercoat film may be formed by use of a well-known plating method or may be formed of a sputter film such as an Ni thin-film or the like, this film thickness is an extremely important parameter. That is, if the film thickness is large, there arises a problem that the thin film is stripped off in the plating step.

Therefore, in this embodiment, the film thickness was controlled to be in a range of from 0.015 to 0.035 $\mu$m, especially in a range of from 0.02 to 0.03 $\mu$m. If the film thickness is out of this range, there arises a problem that uniform plating processing becomes impossible (if the undercoat film thickness is thin), or the undercoat film 36 or the plating film 37 which is formed with a micro-dot pattern is stripped off (if the undercoat film thickness is thick).

Although various metals may be used as the material for the undercoat film 36 and the plating layer 37 formed by the plating method, Ni material was used here in consideration of uniformity of film thickness and mechanical performance.

Next, as shown in the step (L), the obtained plating film 37 is stripped off from the silicon substrate 30 so as to be used as the stamper 38 for forming micro-dots in the surface of the light guide plate. At this time, in order to obtain a light guide plate with a high light utilization efficiency, it is important to perform abrasion on the micro-dot surface. Therefore, abrasion was performed with alumina abrasive grains the average grain size of which was in a range of from 0.1 to 1 $\mu$m in this embodiment. However, it is not limited to the above abrasion, hand lapping or machine lapping with diamond abrasive grains may be performed.

Finally, as shown in the step (M), for example, the obtained stamper is fixed to a matrix of an injection molder by a magnet, a vacuum chuck, or the like, and a material to form the light guide plate is supplied to the matrix. Thus, the light guide plate having micro-dots with predetermined dimensions is completed. Incidentally, extrusion molding, compression molding, vacuum molding, or the like, which are known well, may be used as the molding method.

General transparent plastic materials are available as the material to form the light guide plate. Specific examples of available materials include acrylic plastic, polycarbonate resin, polyacetal resin, polyolefin resin, ultraviolet-curing plastic material. Particularly, since acrylic resin material is superior in transparency, price, moldability, and so on, it is a material suitable for manufacturing the light guide plate according to this embodiment.

Next, description will be made about a second embodiment where the aforementioned light guide plate has been applied to a liquid-crystal display device, with reference to FIG. 18.

Figure 18:
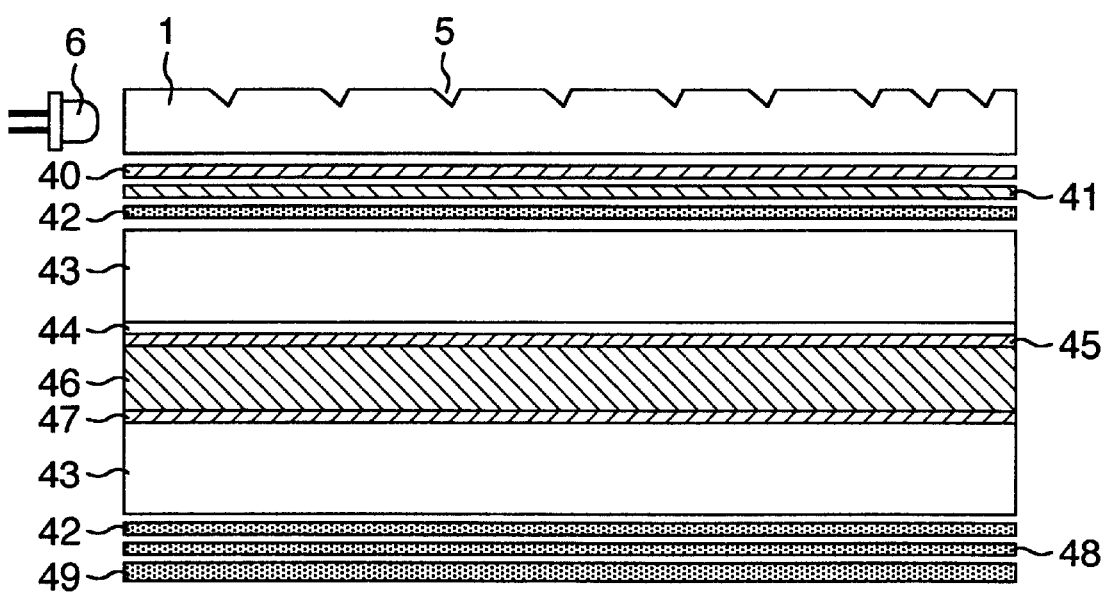
FIG. 18 is a view for explaining a liquid-crystal display device with an illuminator disposed in front of the display device according to a second embodiment.

FIG. 18 is a schematic sectional view of a liquid-crystal display device. On the lower surface of the light guide plate 1, there are disposed a polarizer 40, a phase-difference film 41, a diffusing film 42, a glass substrate 43, a color filter 44, a pixel electrode 45, a liquid-crystal cell 46, a TFT 47, a reflection polarizer 48, an absorbing film 48, etc. This configuration shows an example of a well-known reflection type liquid-crystal display device. Various configurations may be considered in accordance with applications of liquid-crystal display devices.

Specific examples of a light source 6 include a cathode-ray tube, a light emission diode, an EL element, etc. as mentioned above. A suitable light source is selected from the point of view of power consumption, use form, etc. In this embodiment, five light emission diodes were used. In addition, optical parts including the liquid-crystal cell 46 are not limited specifically. Well-known parts were used for the optical parts.

The light guide plate measured about 30×30×1 mm. Each of micro-dots 5 which is formed on the surface of the light guide plate 1 measured 0.01 mm in dot short-side length, 0.08 mm in dot long-side length, 40° in sectional inclination angle, and 70.6° in vertex angle. Particularly, the sectional inclination angle was set to be 40° so as to make the light divergent angle in a range of about ±25° and so as to restrain the divergence of the exiting angle from the light guide plate 1 to be small because the light sources 6 were made of light emission diodes (see FIGS. 8A to 8C and FIGS. 9A and 9B).

Figure 19:
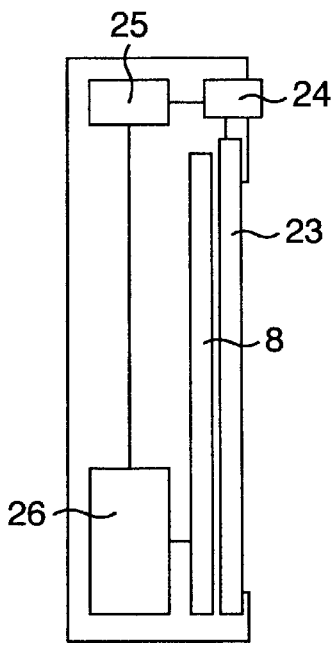
FIG. 19 is a schematically sectional view of the liquid-crystal display device with the illuminator disposed in front of the display device.

FIG. 19 is a view conceptually showing a section of a liquid-crystal display device in front of which the aforementioned illuminator has been disposed. Other than the illuminator 23 disposed in front of the liquid-crystal display device 8, there are provided a driving circuit 26 for driving the liquid-crystal display device 8, a control circuit 24 and a power supply 25 for driving the liquid-crystal display device 8 and the driving circuit 26.

Under a normal usage environment, for example, when the liquid-crystal display device 8 is used indoors or outdoors with sufficient external light, display showing sufficient luminance can be performed without using the illuminator 23. If the light quantity from the external light is insufficient, the illuminator 23 is controlled by the control circuit 24 so that required light can be supplied from the light sources to the liquid-crystal display device 8.

When the liquid-crystal display device was irradiated with the light from the light sources in addition to the external light with the above configuration, the liquid-crystal display device exerted much higher visibility than a background-art liquid-crystal display device having no light guide plate. Thus, high luminance display could be attained. Since it will go well if the illuminator 23 is operated in accordance with necessity, the power consumption can be reduced while visibility required of the liquid-crystal display device is ensured.

Figure 20:
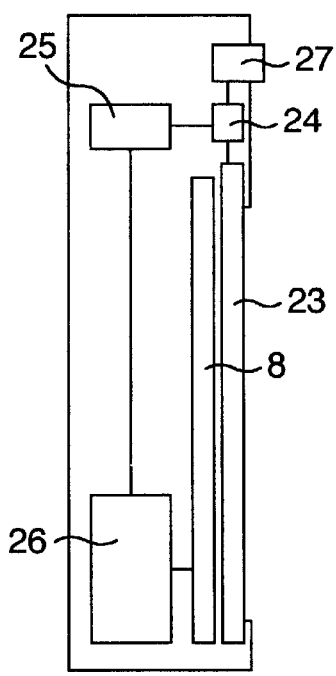
FIG. 20 is a schematically sectional view of a portable electronic apparatus according to a third embodiment.

FIG. 20 is a conceptual view for explaining a third embodiment.

In this embodiment, a portable electronic apparatus in which the illuminator 23 has been disposed in front of the liquid-crystal display device 8 is illustrated. In addition to the configuration of the embodiment shown in FIG. 20, the portable electronic apparatus has a light receiving element 27 disposed on the side facing the liquid-crystal display device 8. Specifically, a mobile liquid-crystal display device, a portable telephone, or the like, is assumed.

In this case, for example, external light, for example, sunlight or the like, is received also in the light receiving element 27, and an electric signal converted in the light receiving element 27 is supplied to the control circuit 24. Then, the control circuit 24 controls the illuminator 23 in accordance with the magnitude of this electric signal so as to adjust the quantity of light with which the liquid-crystal display device 8 is irradiated.

Figure 21:
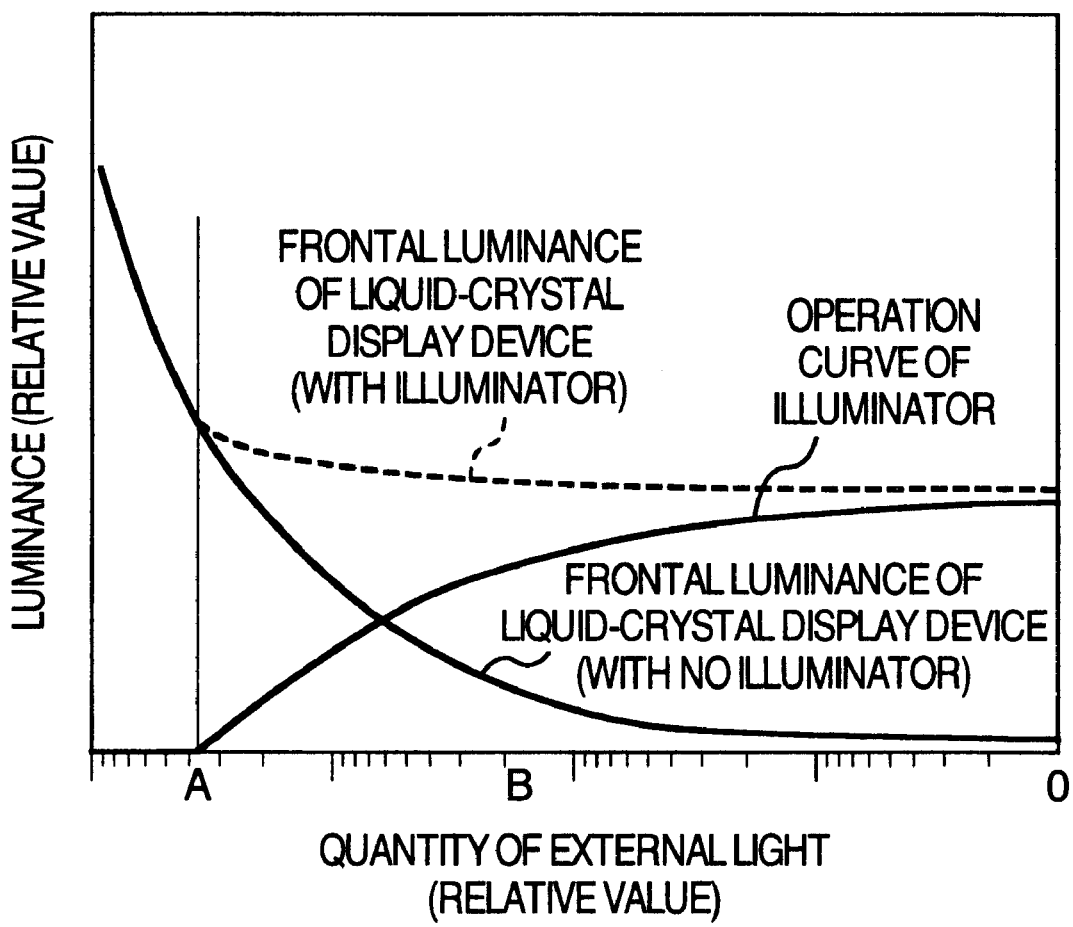
FIG. 21 is a graph for explaining the relationship between the frontal luminance of the liquid-crystal display device and the quantity of external light.

FIG. 21 is a view conceptually showing the relationship between the quantity of external light and the luminance of the liquid-crystal display device. The abscissa designates that the quantity of external light increases as the abscissa goes toward the left side. As is apparent from this drawing, when the quantity of external light is large, the frontal luminance of the liquid-crystal display device can be ensured sufficiently so that the illuminator does not have to be operated.

However, as the quantity of external light decreases, the frontal luminance of the liquid-crystal display device is lowered. In this state, sufficient frontal luminance of the liquid-crystal display device cannot be ensured so that the visibility of display is remarkably lowered.

In such a case, when the illuminator is operated in accordance with the operation curve of the illuminator as illustrated in FIG. 21, sufficient visibility of display can be attained even if the quantity of external light is insufficient. In addition, the liquid-crystal display device can be controlled to make display with substantially constant luminance regardless of the quantity of external light.

As has been described above, according to this embodiment, light can be automatically supplied from the illuminator in accordance with the quantity of external light. Accordingly, the visibility of the liquid-crystal display device can be enhanced while the convenience of being a portable apparatus is ensured.

Incidentally, the aforementioned embodiment is only an example, and not to say, the present invention is not limited to the embodiment. For example, a receiving terminal or a receiving device for receiving an information signal may be further provided so that, when an information signal is received, the control circuit controls the illuminator (including the light receiving element) with this signal as a trigger to thereby adjust the frontal luminance of the liquid-crystal display device. Alternatively, an observer may use a switch or a volume to be able to adjust the frontal luminance of the liquid-crystal display device as the occasion demands.

As has been described above, the luminance of a display screen can be enhanced by disposing an illuminator according to the present invention in front of a liquid-crystal display device. In addition, a light guide plate which is high in light utilization efficiency can be manufactured by using an anisotropic etching method on a silicon substrate having a predetermined crystal plane.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

We claim:

1. A front-lighting illuminator, comprising:
    a front light guide plate; and
    a light source disposed on one of side surfaces of said front light guide plate;
    wherein said front light guide plate includes an incidence surface on which light from said light source is incident, and two light transmission surfaces, said incident light being made to exit from one of said two transmission surfaces thereof and to enter a liquid-crystal cell through a front surface thereof which is disposed behind said front light guide plate; and
    wherein a plurality of dots each constituted by a small recess or protrusion portion for reflecting said light from said incidence surface toward said one light transmission surface are formed in or on another surface of said two light transmission surfaces of said front light guide plate opposite to said one light transmission surface, each of said dots being substantially rectangular in plan view and being substantially V-shape in section with a vertex angle of about 70.6°±2.5°, and an inclination angle of said section being in a range of from 35° to 43° so as to enable an increase of light quantity exiting from said front light guide plate and entering said liquid crystal cell.

2. A front-lighting illuminator disposed on a front surface of a liquid-crystal cell, comprising:
    a front light guide plate; and
    a light source disposed on one of side surfaces of said front light guide plate;
    wherein said front light guide plate includes an incidence surface on which light from said light source is incident, and two light transmission surfaces, said incident light being made to exit from one of said two transmission surfaces of said front light guide plate and to enter said liquid-crystal cell through the front surface thereof; and
    wherein a plurality of dots each constituted by a small recess or protrusion portion for reflecting said light from said incidence surface toward said one light transmission surface are formed in or on another surface of said two transmission surfaces of said light guide plate opposite to said one light transmission surface, each of said dots being substantially rectangular in plan view and being substantially V-shape in section with a vertex angle of about 70.6°±2.5°, an inclination angle of said section being in a range of from 35° to 43°, an area not smaller than 95% of a whole area of the surface where said dots are formed is sectioned into 0.25 to 1 mm$^2$ square areas, and said dots are disposed in each of said square areas so that a function $G(R)$ which is obtained by taking a weighted average of a radial distribution function $g(R)$ obtained for each of said dots in accordance with an arrangement relationship of said dots and which is obtained by approximating said weighted average by a least squares method satisfies a relation of $0<S_1/S_2<0.2$ in a range of $R/R_0 = 3$ to 6 so as to enable an increase of light quantity exiting from said front light guide plate entering said liquid-crystal cell;
    provided that R designates a distance from a central position of one dot to a central position of another dot; $R_0$, a value obtained by dividing a length of one side of said square area by a square root of the number of said dots existing in said square area; $S_1$, a value obtained by integrating a difference between $G(R)$ and an average value of $G(R)$ with $R/R0$ which is in a range of from 3 to 6; and $S_2$, a value obtained by integrating said average value of $G(R)$ with $R/R_0$ which is in a range of from 3 to 6.

3. A front-lighting illuminator according to claim 1, wherein:
    each of said dots has a short-side length in a range of from 0.002 to 0.05 mm and a long-side length in a range of from 0.002 to 0.2 mm.

4. A front-lighting illuminator according to claim 1, wherein:
    said dots are disposed at random in or on the other surface of said light guide plate opposite to said light transmission surface.

5. A front-lighting illuminator according to claim 2, wherein:
    each of said dots is disposed so that said function $G(R)$ is substantially 0 in a range of $R<$(short-side length of said dot)X2, at least two peaks exist in said function $G(R)$, and said two peaks each of which said two peaks is at least twice as large as said average value of said function $G(R)$ exist in a range of $R/R_0 = 3$ to 6.

* * * * *